(12) United States Patent
Masamura

(10) Patent No.: US 10,887,515 B2
(45) Date of Patent: Jan. 5, 2021

(54) IMAGE CAPTURING APPARATUS, IMAGE CAPTURING METHOD, AND STORAGE MEDIUM TO GENERATE A PANORAMIC IMAGE HAVING A HIGH DYNAMIC RANGE

(71) Applicant: CANON KABUSHIKI KAISHA, Tokyo (JP)

(72) Inventor: Takuya Masamura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/293,318

(22) Filed: Mar. 5, 2019

(65) Prior Publication Data

US 2019/0281216 A1    Sep. 12, 2019

(30) Foreign Application Priority Data

Mar. 7, 2018    (JP) .................................. 2018-041196

(51) Int. Cl.
*H04N 5/232*    (2006.01)
*H04N 5/235*    (2006.01)
*G06T 5/50*    (2006.01)

(52) U.S. Cl.
CPC .......... *H04N 5/23238* (2013.01); *G06T 5/50* (2013.01); *H04N 5/2355* (2013.01);
(Continued)

(58) Field of Classification Search
CPC ............. H04N 5/23238; H04N 5/2355; H04N 5/23299; H04N 5/144; H04N 5/232;
(Continued)

(56) References Cited

U.S. PATENT DOCUMENTS

2010/0110180 A1*    5/2010    Tonogai .................... G06T 5/50
348/136
2010/0157078 A1*    6/2010    Atanassov .............. G06T 5/007
348/222.1
(Continued)

FOREIGN PATENT DOCUMENTS

JP    2012-80432 A    4/2012
JP    2012-186593 A    9/2012
(Continued)

*Primary Examiner* — Tracy Y. Li
(74) *Attorney, Agent, or Firm* — Canon U.S.A., Inc. IP Division

(57) ABSTRACT

An image capturing apparatus sets exposure states to make the exposure states different from each other while an image sensor captures two or more adjacent images among a plurality of images. A first synthesis is performed on the images of different exposure states among the plurality of images to generate a plurality of first synthesized images having a wider dynamic range than a dynamic range of the images of different exposure states. A second synthesis is performed using the plurality of first synthesized images to generate a second image having a wider viewing angle than a viewing angle of the plurality of first synthesized images. One of the plurality of images is used in the synthesis of different first synthesized images, and combinations of the images used in the first synthesis are different in adjacent first synthesized images.

12 Claims, 5 Drawing Sheets

(52) U.S. Cl.
CPC ............... *G06T 2207/10144* (2013.01); *G06T 2207/20208* (2013.01); *G06T 2207/20221* (2013.01)

(58) Field of Classification Search
CPC ............. G06T 5/50; G06T 2207/10144; G06T 2207/20208; G06T 2207/20221
See application file for complete search history.

(56) References Cited

U.S. PATENT DOCUMENTS

| | | | |
|---|---|---|---|
| 2014/0146131 A1* | 5/2014 | Niemi | G03B 37/04 348/36 |
| 2014/0320594 A1* | 10/2014 | Park | H04N 5/23238 348/36 |
| 2018/0012335 A1* | 1/2018 | Adsumilli | G06T 3/4038 |

FOREIGN PATENT DOCUMENTS

| | | |
|---|---|---|
| JP | 2012-213105 A | 11/2012 |
| JP | 2013-175827 A | 9/2013 |

* cited by examiner

IMAGE CAPTURING APPARATUS, IMAGE CAPTURING METHOD, AND STORAGE MEDIUM TO GENERATE A PANORAMIC IMAGE HAVING A HIGH DYNAMIC RANGE

BACKGROUND OF THE INVENTION

Field of the Invention

One disclosed aspect of the embodiments relates to an image capturing apparatus configured to synthesize a plurality of images to generate a panoramic image, and in particular, relates to an image capturing apparatus for generating a panoramic image having a high dynamic range.

Description of the Related Art

There is known a method for generating a panoramic image by capturing a plurality of images while panning an image capturing apparatus, such as a digital camera, and then by connecting the captured images. Japanese Patent Application Laid-Open No. 2013-175827 discusses a technique for panoramic image capturing in which images of different exposure states are captured, a plurality of panoramic images of the same exposure state is generated for each exposure state, and panoramic images of different exposure states are synthesized to generate a high dynamic range panoramic image (hereinafter, "HDR panoramic image"). However, the technique discussed in Japanese Patent Application Laid-Open No. 2013-175827 requires a large-capacity of memory in the image capturing apparatus so as to hold a plurality of panoramic images for each of the same exposure state.

Japanese Patent Application Laid-Open No. 2012-80432 discusses a technique for synthesizing images while panning an image capturing apparatus. Japanese Patent Application Laid-Open No. 2012-80432 discusses a technique for generating an HDR panoramic image by capturing six images under three different exposure state3 to synthesize them. For the sake of simplicity, assume that a case in which the technique discussed in Japanese Patent Application Laid-Open No. 2012-80432 is applied to a case of capturing four images under two different exposure states, "correct" and "under", in one-dimensional direction. In other words, four images of "correct", "under", "correct", and "under" exposure states are sequentially captured, and the two images of "correct" exposure and the two images of "under" exposure are respectively synthesized to generate two separate HDR images. Lastly, the two HDR images are panoramically synthesized to generate an HDR panoramic image. In the technique discussed in Japanese Patent Application Laid-Open No. 2012-80432, it is unnecessary to store a plurality of large-size panoramic images simultaneously. Therefore, the amount of memory to be used in the technique is likely to be less than that in the technique discussed in Japanese Patent Application Laid-Open No. 2013-175827.

However, in the technique discussed in Japanese Patent Application Laid-Open No. 2012-80432, the HDR panoramic synthesis is performed while panning until an HDR panoramic image is eventually generated. Therefore, the panning speed is limited compared to common panoramic synthesis.

For example, in a case of capturing four images in commonly used panoramic image capturing, the number of images that are eventually used for generating a panoramic image is also four. On the other hand, in the method discussed in Japanese Patent Application Laid-Open No. 2012-80432, the number of images that are eventually used for generating an HDR panoramic image is two, as described above. Thus, in the case of synthesis described in Japanese Patent Application Laid-Open No. 2012-80432, when using a selected region of the same viewing angle for synthesizing of a panoramic image, unless the panning speed is limited, HDR images to be used for synthesizing of the panoramic image may not include enough overlapped portion, and thus an HDR panoramic image cannot be generated.

SUMMARY OF THE INVENTION

One aspect of the embodiments is directed to a method of reducing a restriction on the panning speed in the case of synthesis of an HDR panoramic image while a panning operation.

According to an aspect of the embodiments, an image capturing apparatus sets exposure states to make the exposure states different from each other while the image sensor captures two or more adjacent images among the plurality of images. A first synthesis is performed on the images of different exposure states among the plurality of images to generate a plurality of first synthesized images having a wider dynamic range than a dynamic range of the images of different exposure states. A second synthesis is performed using the plurality of first synthesized images to generate a second image having a wider viewing angle than a viewing angle of the plurality of first synthesized images One of the plurality of images is used in the synthesis of different first synthesized images, and combinations of the images used in the first synthesis are different in adjacent first synthesized images.

According to another aspect of the embodiments, an image capturing apparatus includes an image capturing unit, a synthesis unit, and a setting unit. The image capturing unit is configured to capture an image while a panning operation. The synthesis unit is configured to synthesize the plurality of images captured by the image capturing unit while the panning operation to generate a synthesized image. The setting unit is configured to set an exposure value at the time of image capturing, wherein the setting unit sets the exposure value such that the exposure value is changed while two or more adjacent images among the plurality of images are captured. The synthesis unit performs first synthesis on the images of different exposure states among the plurality of images to generate a first synthesized image having a wider dynamic range than a dynamic range of the images of different exposure states. The synthesis unit performs the first synthesis on the plurality of images. The synthesis unit generates the plurality of first synthesized images. The synthesis unit performs second synthesis using the plurality of first synthesized images to generate a second image having a wider viewing angle than a viewing angle of the first synthesized image. The synthesis unit performs calculation for the alignment at the time of performing the first synthesis, and uses a result of the calculation in the alignment at the time of performing the second synthesis.

According to yet another aspect of the embodiments, an image capturing apparatus includes an image capturing unit, a synthesis unit, and a setting unit. The image capturing unit is configured to capture an image while a panning operation. The synthesis unit is configured to synthesize the plurality of images captured by the image capturing unit while the panning operation to generate a synthesized image. The setting unit is configured to set two exposure values at the time of image capturing. The setting unit sets the exposure value such that the exposure value is changed while two adjacent images among the plurality of images are captured. The synthesis unit performs first synthesis on two images and other two images among the plurality of images to generate a first synthesized image having a wider dynamic range than a dynamic range of the two images. The synthesis unit performs second synthesis using the plurality of first synthesized images to generate a second image having a wider viewing angle than a viewing angle of the first synthesized image, and performs the first synthesis on the second image and two second images adjacent to the image.

Further features of the disclosure will become apparent from the following description of exemplary embodiments with reference to the attached drawings.

DESCRIPTION OF THE EMBODIMENTS

An exemplary embodiment will be described below with reference to the attached drawings.

Figure 1:
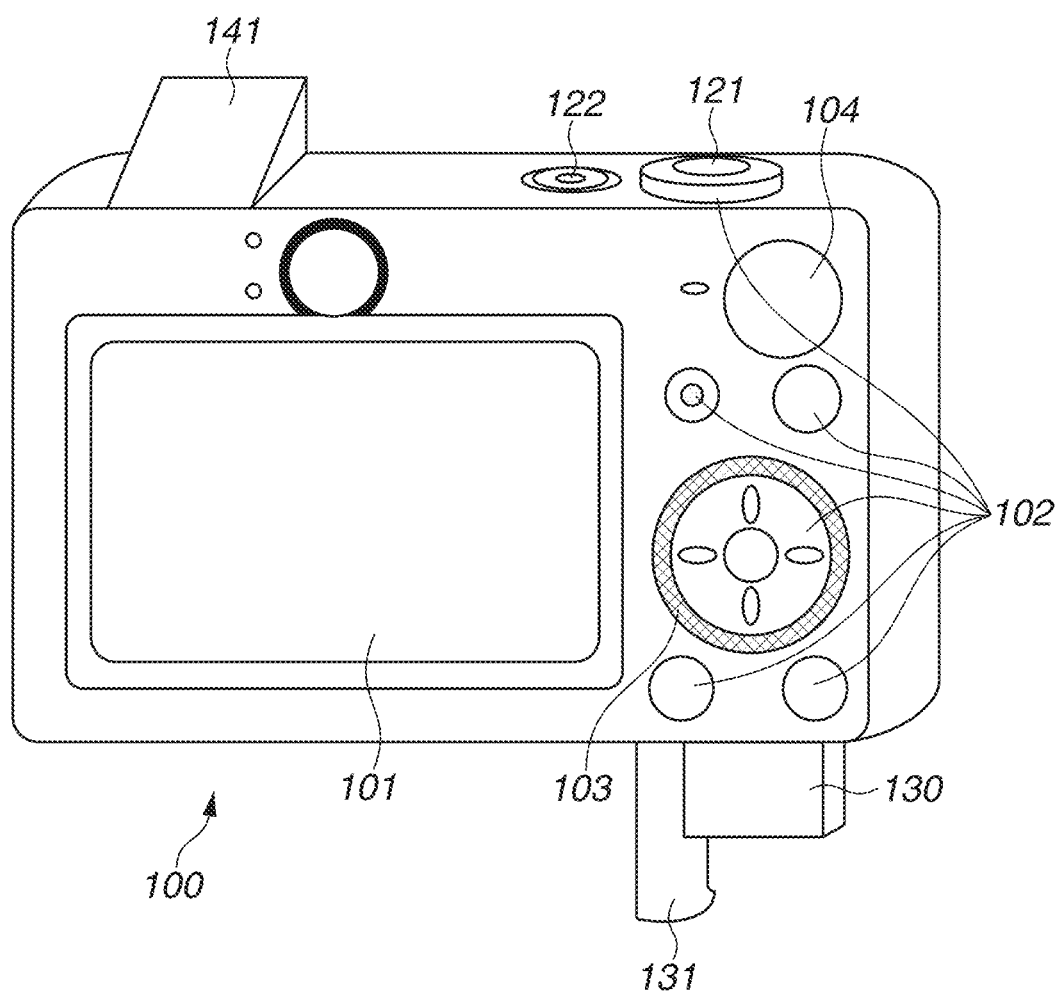
FIG. 1 is a perspective view schematically illustrating a structure of a digital camera viewed from the rear side thereof according to an exemplary embodiment.

FIG. 1 is a perspective view schematically illustrating a structure of a digital camera viewed from the rear side thereof according to the exemplary embodiment.

On the back side of a digital camera 100, a display unit 101 and an operation unit 102 are provided The display unit 101 displays an image and various types of information. The operation unit 102 includes various switches and buttons configured to accept various user operations. On the back side of the digital camera 100, a mode selection switch 104 for changing, for example, an image capturing mode and a rotatable controller wheel 103 are provided. On the top side of the digital camera 100, a shutter button 121 for providing an image capturing instruction, a power switch 122 for turning on/off a power source of the digital camera 100, and an electronic flash 141 configured to emit a flash light to an object are provided.

The digital camera 100 is connectable to an external apparatus via wired or wireless communication and is capable of outputting, for example, image data (still image data, moving image data) to the external apparatus. The lower side of the digital camera 100 includes a recording medium slot (not illustrated) that can be opened and closed with a cover 131. A recording medium 130 such as a memory card can be inserted into and removed from the recording medium slot.

Figure 2:
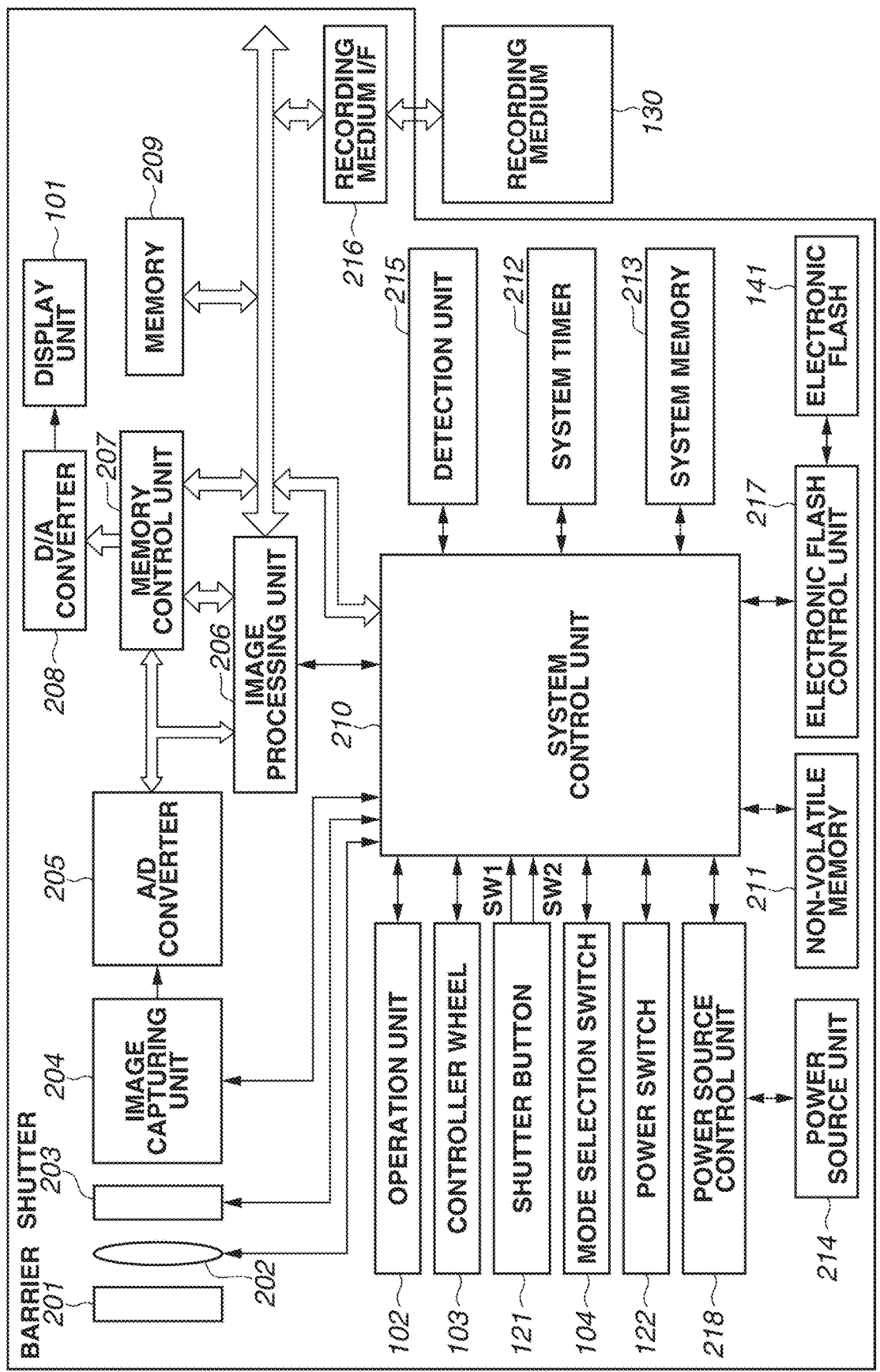
FIG. 2 is a block diagram illustrating a hardware configuration of the digital camera according to the exemplary embodiment.

The recording medium 130 stored in the recording medium slot can communicate with a system control unit 210 of the digital camera 100 (refer to FIG. 2). The recording medium 130 is not limited to, for example, a memory card that can be inserted into and removed from the recording medium slot. An optical disk or a magnetic disk such as a hard disk may also be applicable. Alternatively, the recording medium 130 may be built in the main body of the digital camera 100.

FIG. 2 is a block diagram illustrating a hardware configuration of the digital camera 100. The digital camera 100 includes a barrier 201, an image capturing lens 202, a shutter 203, and an image capturing unit 204. The barrier 201 covers an image capturing optical system to prevent contamination and breakage of the image capturing optical system. The image capturing lens 202 includes lenses including a zoom lens and a focus lens, and constitutes the image capturing optical system. The shutter 203 includes an aperture function and adjusts the exposure amount with respect to the image capturing unit 204. The image capturing unit 204 is an image capturing element configured to convert an optical image into an electric signal (analog signal) and includes, for example, an image sensor such as a charge-coupled device (CCD) sensor or complementary metal-oxide semiconductor (CMOS) sensor having a Bayer array structure in which red/green/blue (RGB) pixels are regularly arranged. The shutter 203 may be a mechanical shutter, or an electronic shutter that is configured to control an accumulation time based on the control of the reset timing for the image capturing element.

Alternatively, the image capturing unit 204 can be configured to have a structure in which a plurality of photoelectric conversion portions is provided with respect to one pixel to acquire a stereo image so that the automatic focal point detection (AF) processing described below is executed more rapidly.

The digital camera 100 further includes an analog to digital (A/D) converter 205, an image processing unit 206, a memory control unit 207, a digital to analog (D/A) converter 208, a memory 209, and the system control unit 210. The image capturing unit 204 outputs an analog signal to the A/D converter 205, and the A/D converter 205 converts the acquired analog signal into image data composed of digital signal and outputs the image data to the image processing unit 206 or the memory control unit 207.

The image processing unit 206 performs a number of image processing operations. These image processing operations may include, for example, correction processing, such as pixel interpolation and shading correction, white balance processing, gamma-correction processing, color conversion processing, and luminance adjustment processing, on the image data acquired from the A/D converter 205 or data acquired from the memory control unit 207. The luminance adjustment processing is realized by, for example, digital gain adjustment processing. Further, the image processing unit 206 realizes an electronic zoom function by selecting an image area for performing zooming processing. Further, the image processing unit 206 performs predetermined computation processing using the image data of a captured image, and the system control unit 210 performs exposure control and distance measurement control based on the obtained computation processing result. For example, the system control unit 210 performs through-the-lens (TTL) autofocus (AF) processing, automatic exposure (AE) processing, and electronic flash pre-emission (EF) processing. The image processing unit 206 performs predetermined computation processing using the image data of a captured image, and the system control unit 210 performs TTL auto white balance (AWB) processing using the obtained computation processing result.

The image processing unit 206 includes an image synthesis processing circuit configured to synthesize a plurality of images to form a panoramic image and check the synthesis result of the panoramic image. For example, the image synthesis processing circuit determines that the synthesis is unsuccessful if the number of synthesized images does not satisfy a predetermined number or if the length of a synthesized image does not satisfy a reference value. Further, the image processing unit 206 includes a geometric conversion circuit configured to perform blur amount calculation, alignment, cylindrical coordinate conversion, and distortion correction for the synthesis of a panoramic image.

Alternatively, the function of image synthesis processing may be realized by software processing performed by the system control unit 210 in place of the configuration including the image processing unit 206. The system control unit 210 may include at least a processor and at least a memory. The memory may be configured to store instructions or a program. The processor may be configured to communicate with the memory and configured to execute the instructions to perform operations described in the following (e.g., in the flowcharts shown in FIGS. 4 and 5).

Image data output from the A/D converter 205 is written into the memory 209 via the image processing unit 206 and the memory control unit 207 or via the memory control unit 207. The memory 209 is also used as a memory for image display (video memory), to store image data to be displayed on the display unit 101. The memory 209 has sufficient storage capacity to store a predetermined number of still images, panoramic images (wide-angle images), and panoramic image synthesis results. The memory 209 can also be used as a work area onto which the system control unit 210 loads, for example, a computer program or other data, read from a non-volatile memory 211.

Data for image display (digital data) that is stored in the memory 209 is transmitted to the D/A converter 208. The D/A converter 208 converts received digital data into an analog signal and supplies the converted analog signal to the display unit 101, whereby an image is displayed on the display unit 101. The display unit 101 is a display apparatus such as a liquid crystal display or organic electroluminescence display (organic EL display), and displays an image based on the analog signal from the D/A converter 208. The image display on the display unit 101 is turned on/off by the system control unit 210, and the power consumption is reduced by turning off the image display. A digital signal which is originated from the image capturing unit 204 is accumulated in the memory 209 through the A/D converter 205. The digital signal is converted into an analog signal by the D/A converter 208. In addition, by sequentially displaying the analog signal on the display unit 101, an electronic view finder function for displaying a through image can be realized.

The digital camera 100 includes the non-volatile memory 211, a system timer 212, a system memory 213, a detection unit 215, and an electronic flash control unit 217. The non-volatile memory 211 is an electrically erasable and storable memory (e.g., electrically erasable programmable read-only memory (EEPROM)) and stores, for example, a computer program to be executed by the system control unit 210 and constants for operations. Further, the non-volatile memory 211 includes a memory region for storing system information and a memory region for storing user setting information. The system control unit 210 reads and restores various information, such as settings, stored in the non-volatile memory 211 at a startup of the digital camera 100.

The system control unit 210 includes a central processing unit (CPU) and executes various program codes stored in the non-volatile memory 211 to control the entire operation of the digital camera 100. Information, such as a computer program, constants and variables for operations, read by the system control unit 210 from the non-volatile memory 211 are loaded into the system memory 213. A random-access memory is used for the system memory 213. Further, the system control unit 210 performs display control by controlling, for example, the memory 209, the D/A converter 208, the display unit 101. The system timer 212 measures the time for use in various control and the time indicated by a built-in clock. The electronic flash control unit 217 controls the emission of light of the electronic flash 141 based on the brightness of an object. A detection unit 215 includes a gyro and sensor to acquire, for example, angular velocity information and orientation information about the digital camera 100. The angular velocity information includes information about the angular velocity and angular acceleration at the time of panoramic image capturing by the digital camera 100. Further, the orientation information includes information about a tilt of the digital camera 100 with respect to the horizontal direction.

The display unit 101, the operation unit 102, the controller wheel 103, the shutter button 121, the mode selection switch 104, the power switch 122, and the electronic flash 141 in FIG. 2 are the same as those described above with reference to FIG. 1.

Various operation members of the operation unit 102 are used in, for example, selecting various function icons displayed on the display unit 101. When a predetermined function icon is selected, a different function is assigned to each operation member depending on each scene. Thus, the operation members of the operation unit 102 act as various function buttons. Examples of function buttons include an end button, return button, image forward button, jump button, depth-of-field preview button, attribute change button, and display setting (DISP) button. For example, if a menu button is pressed, a menu screen for setting various settings is displayed on the display unit 101. The user can intuitively perform setting operation using the menu screen displayed on the display unit 101, and a four-direction (upward, downward, rightward, and leftward) button or a SET button.

The controller wheel 103 is a rotatable operation member, and is used together with the four-direction button, for example, for designating a selection item. If the controller wheel 103 is operated, an electric pulse signal is generated corresponding to the operation amount (such as a rotation angle and the number of times of rotation). The system control unit 210 analyzes the electric pulse signal and controls each member of the digital camera 100.

The shutter button 121 includes a first switch SW1 and a second switch SW2. The first switch SW1 is turned on if the shutter button 121 is pressed halfway. With this operation, an instruction signal is transmitted to the system control unit 210 for an image capturing preparation. If the system control unit 210 receives a signal indicating that the first switch SW1 is turned on, the system control unit 210 starts operation such as AF processing, AE processing, AWB processing, and EF processing. The second switch SW2 is turned on if the shutter button 121 is fully pressed (complete operation), and consequently, an instruction signal for an image capturing start is transmitted to the system control unit 210. If the system control unit 210 receives a signal indicating that the second switch SW2 is turned on, the system control unit 210 performs a series of image capturing operations from the signal reading from the image capturing unit 204 to the writing of image data into the recording medium 130.

The mode selection switch 104 is a switch for changing the operation mode of the digital camera 100 between various modes such as a still image capturing mode, a moving image capturing mode, and a reproduction mode. The still image capturing mode includes an auto image capturing mode, and further includes a panoramic image capturing mode in which a panoramic image is synthesized by panoramic image capturing, and a high dynamic range (HDR) panoramic image capturing mode.

The digital camera 100 includes a power source unit 214 and a power source control unit 218. The power source unit 214 is, for example, a primary battery (e.g., an alkaline battery and lithium battery), a secondary battery (e.g., a nickel-cadmium (NiCd) battery, nickel metal hydride (NiMH) battery, and lithium-ion (Li) battery), or an alternating current (AC) adapter. The power source unit 214 supplies power to the power source control unit 218. The power source control unit 218 detects, for example, whether a battery is mounted on the power source unit 214, the battery type, remaining battery amount. The power source control unit 218 supplies a necessary voltage for a necessary period of time to each member including the recording medium 130 based on the detection result and an instruction from the system control unit 210.

The digital camera 100 includes a recording medium interface (recording medium UF) 216 configured to enable communication between the recording medium 130 and the system control unit 210 when the recording medium 130 is inserted in the recording medium slot (not illustrated). Since details of the recording medium 130 are already described above with reference to FIG. 1, description thereof is omitted.

Since a panoramic image covers a wide angle of view, one panoramic image may include objects where dynamic range significantly differs. In this case, a technique of HDR synthesis is often applied to a panoramic image. Furthermore, a panoramic image may have a wider viewing angle than a viewing angle, or viewing angles, of the individual synthesized images having HDR.

Figure 3:
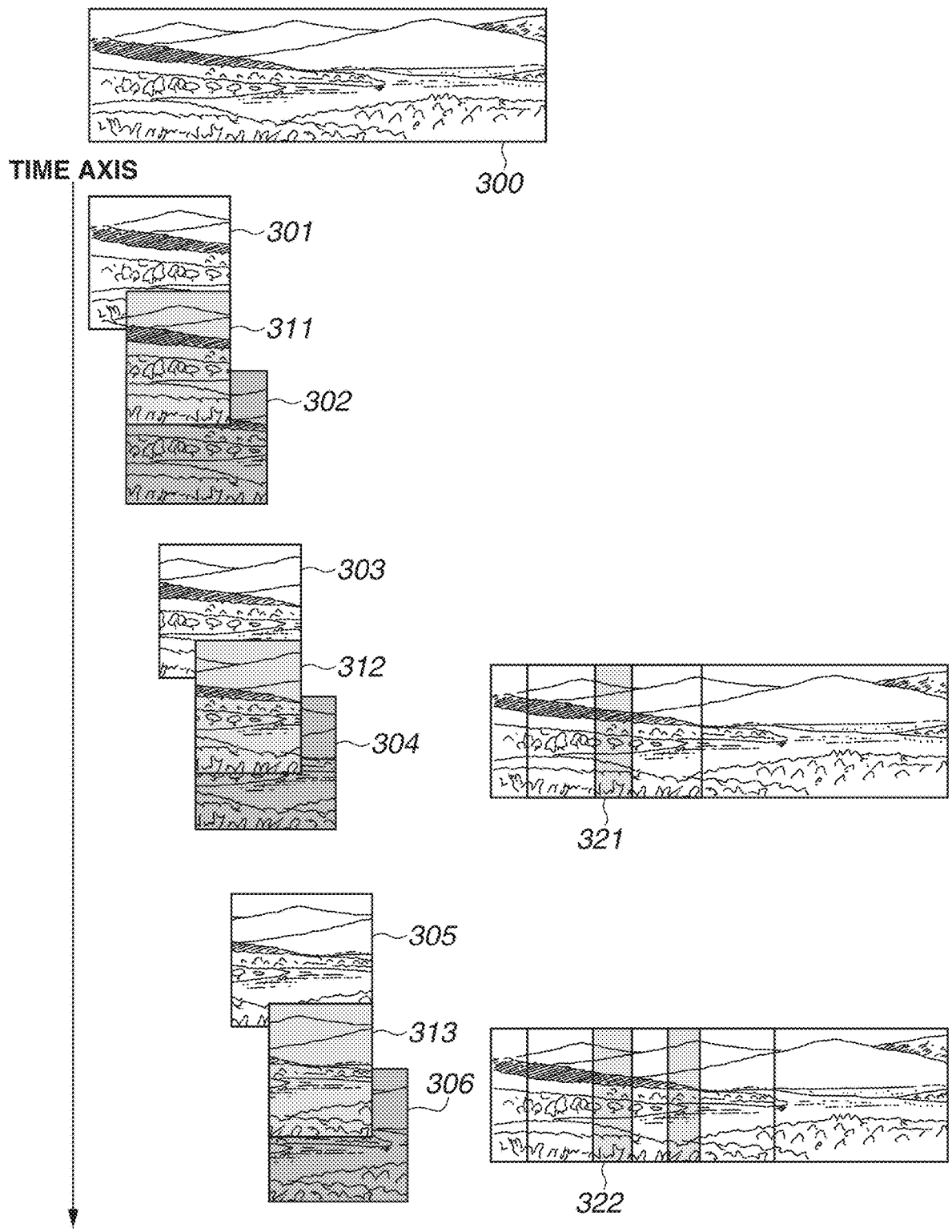
FIG. 3 is a diagram illustrating an example of generating a panoramic high dynamic range (HDR) image without simultaneously recording a plurality of large-capacity panoramic images

FIG. 3 illustrates an example of generating a conventional panoramic HDR image. In the example illustrated in FIG. 3, a panoramic HDR image is generated while a panning operation is performed, and the recording capacity needed is reduced if an original image is erased as soon as the HDR synthesis is finished. While only images under two exposure states ("under" and "correct") are used in FIG. 3 to simplify the description below, the technique is also applicable to a case of images under three or more exposure states.

First, suppose that the digital camera 100 captures six images 301, 302, 303, 304, 305, and 306 of an object region 300 while performing panning. Among the images 301 to 306, the images 301, 303, and 305 are under a "correct" exposure state, whereas the images 302, 304, and 306 are under an "under" exposure state. Next, the image processing unit 206 composes the respective images 301, 302, 303, 304, 305, and 306 to generate HDR images 311 to 313. In essence, the image processing unit 206 performs a first synthesis on the images 301, 302, 303, 304, 305, and 306 which are of different exposure states among the images that are captured. The first synthesis generates a number of first synthesized images, such as the HDR images 311 to 313, which have a wider dynamic range than a dynamic range of the images 301, 302, 303, 304, 305, and 306 of different exposure states. Lastly, the image processing unit 206 sequentially synthesizes the HDR images 311 to 313 to generate a panoramic image. This synthesis may be referred to as a second synthesis. The image processing unit 206 performs the second synthesis using the first synthesized images, such as the HDR images 311 to 313, to generate the panoramic image. The panoramic image may be referred to as a second image. It may have a wider viewing angle than a viewing angle of the first synthesized images (e.g., the HDR images 311 to 313). First, the image processing unit 206 synthesizes the HDR images 311 and 312 to generate a panoramic image 321. Next, the image processing unit 206 synthesizes the generated panoramic image 321 with the HDR image 313 to generate a panoramic image 322. In an actual synthesis, image distortions and the like are taken into consideration. Thus, in many cases, a portion of a predetermined width in the vicinity of the center of a captured image is selected and used for the synthesis instead of using a whole captured image. It should also be noted that one of the captured images is used in the first synthesis that generates the first synthesized images. In addition, combinations of the images (e.g., the images 301, 302, 303, 304, 305, and 306) used in the first synthesis are different in adjacent first synthesized images.

In the synthesis method illustrated in FIG. 3, the images 301 and 302 are erased from the recording medium 130 at a time point at which the HDR image 311 is generated. Similarly, the images 303 and 304 are erased from the recording medium 130 at a time point at which the HDR image 312 is generated. The images 305 and 306 are erased from the recording medium 130 at the time point at which the HDR image 313 is generated. As described above, unnecessary images are erased while the synthesis is performed, whereby the storage capacity needed is reduced.

However, in the synthesis method illustrated in FIG. 3, the HDR images 311 and 312 need to include an overlapped region so as to synthesize an HDR panoramic image without an empty image gap. Similarly, the HDR images 312 and 313 need to include an overlapped region. A panning speed during the image capturing is limited to acquire an overlapped region, and thus if the user performs panning at a high speed, the synthesis of an HDR panoramic image may fail.

In the present exemplary embodiment, so as to improve the capability of the synthesis method illustrated in FIG. 3, a panoramic image is generated while performing panning, and the limitation on the panning speed can be limited. Further, in the present exemplary embodiment, alignment information generated at the time of HDR image synthesis can be used for the synthesis of a panoramic image. Thus the system load may be reduced when the present exemplary embodiment is applied for the same number of HDR images to be synthesized.

Figure 4:
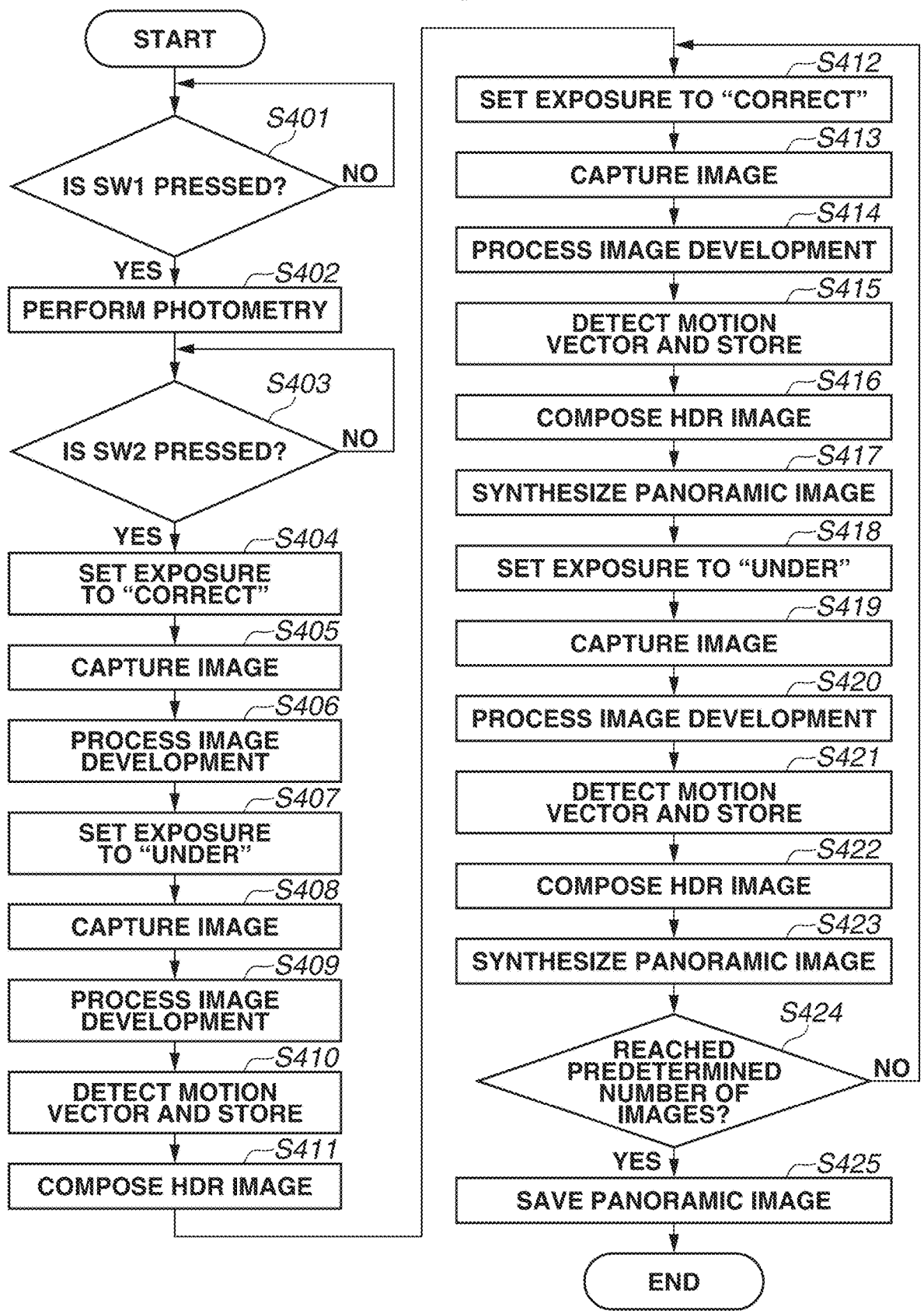
FIG. 4 is a flowchart illustrating an operation according to an exemplary embodiment.
Figure 5:
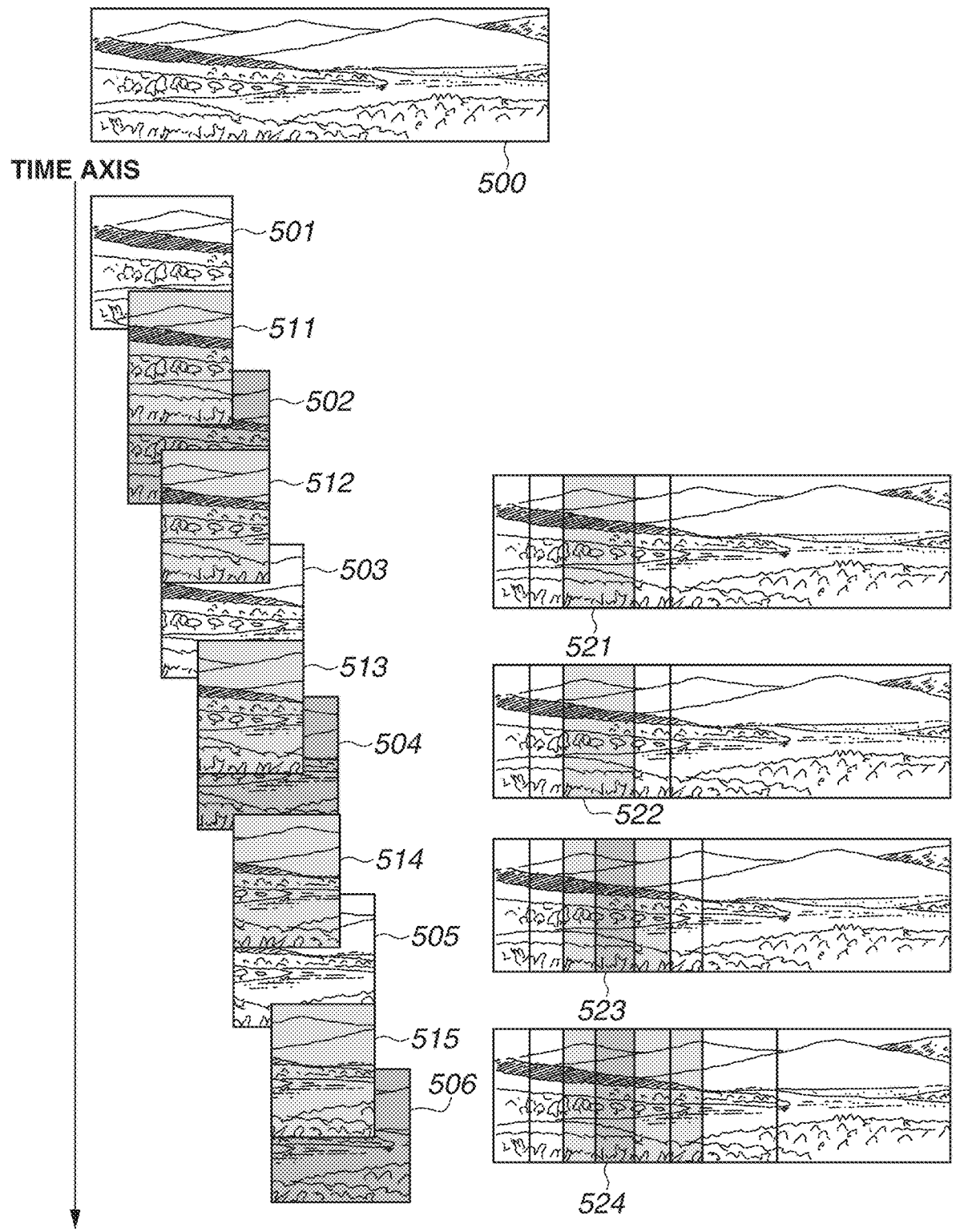
FIG. 5 is a diagram illustrating an operation according to an exemplary embodiment.

FIG. 4 is a flowchart illustrating an operation according to the present exemplary embodiment. FIG. 5 is a diagram illustrating an operation of generating a panoramic HDR image according to the present exemplary embodiment. The following describes a specific implementation method in the present exemplary embodiment with reference to FIGS. 4 and 5. To simplify descriptions, only two exposure states of "correct" and "under" are used in the following description. However, as described above, the exposure states are not limited to the two exposure states, and more exposure states can be applied.

In step S401, the system control unit 210 determines whether the switch SW1 is pressed. If the switch SW1 is pressed (YES in step S401), the processing proceeds to step S402.

In step S402, the system control unit 210 makes a setting for panoramic image capturing. Specifically, a "correct" exposure value and shift amount of exposure are calculated based on a setting specified in advance by the user and a result of photometry with respect to an image capturing range in which the image capturing unit 204 receives light. In the case of the present exemplary embodiment, since there are only two exposure states which are "correct" and "under", the system control unit 210 calculates an exposure value corresponding to "under" from the "correct" exposure value and the shift amount of exposure.

In step S403, the system control unit 210 determines whether the switch SW2 is pressed. If the switch SW2 is pressed, the processing proceeds to step S404. From this time, the user starts a panning operation from one of the ends of a range that the user desires to capture images. In this case, the system control unit 210 may display a message on the display unit 101 that prompts the user to perform a panning operation, such as "Please start a swing" or "Please start a panning operation".

In step S404, the system control unit 210 sets the exposure state to "correct".

In step S405, the image capturing unit 204 captures an image under "correct" exposure state.

In step S406, the image processing unit 206 performs development processing of the image captured in step S405 by the image capturing unit 204 to generate an image for HDR synthesis. The development processing includes white balance processing and gamma-correction processing.

In step S407, the system control unit 210 sets the exposure state to "under".

In step S408, the image capturing unit 204 captures an image under "under" exposure state. This image in the "under" exposure state may be adjacent to the image captured in step S405. The processing in step S406 may be performed in parallel with the processing in steps S407 and S408. Essentially, the overall operation of steps S404, S405, S407, and S408 is to set exposure states to make the exposure states different from each other while the image sensor captures two or more adjacent images among the plurality of images.

In step S409, the image processing unit 206 performs development processing of the image captured in step S408 by the image capturing unit 204. A similar method to the method in step S406 may be used in the development processing.

In the subsequent operations, the image processing unit 206 and/or the system control unit 210 performs alignment processing when performing the first synthesis (e.g., the generation of the HDR images) and the second synthesis (e.g., the generation of the panoramic image). This alignment processing may be accomplished by detection of a motion vector which represents the displacement or motion between the successive images. In step S410, the system control unit 210 detects a motion vector for alignment based on the images for HDR synthesis that are generated in steps S406 and S409. For the motion vector detection, a publicly-known method such as projection transformation may be used. Since the exposure values are different between the images generated in steps S406 and S409, the motion vector detection can fail. Therefore, in the case where the difference between the exposure values is more than or equal to a predetermined value, an image generated in step S406 (or S409) may be gain-decreased, or a gain-increased image can be generated from the image generated in step S409 (or S406) such that the difference between the exposure values becomes less than the predetermined value. Thereafter, the system control unit 210 detects a motion vector using the gain-decreased image or the gain-increased image. The system control unit 210 stores the motion vector detected by the system control unit 210.

In step S411, based on the result of motion vector detection in step S410, the image processing unit 206 composes the images for HDR synthesis that are generated in steps S406 and S409, and generates a single HDR image. Specifically, the image processing unit 206 utilizes the motion vector detected in step S410 to generate an HDR synthesis image through, for example, geometric conversion processing, zooming processing, and trimming processing.

In step S412, the system control unit 210 sets the exposure state to "correct" again.

In step S413, the image capturing unit 204 captures an image under "correct" exposure state. A series of processing described above is performed while a panning operation proceeds. Thus, the image under "correct" exposure state that is captured in step S405 has a different viewing angle from the image captured in step S412.

In step S414, the image processing unit 206 performs development processing of the image captured in step S413. The method of the development processing is similar to that in step S406.

In step S415, the system control unit 210 detects a motion vector. Specifically, the system control unit 210 detects a motion vector from the image for HDR synthesis that is generated in step S414, and an image for HDR synthesis that is generated immediately before (in terms of time) the image generated in step S414 (i.e., an image for HDR synthesis that is adjacent to (in terms of image plane) the image for HDR synthesis that is generated in step S414). The system control unit 210 stores the detected motion vector.

In step S416, the image processing unit 206 performs synthesis with respect to two of the images for HDR synthesis on which the motion vector detection has been performed in step S415.

In step S417, the system control unit 210 synthesizes a panoramic image with respect to an HDR image generated in step S416, and an HDR image generated immediately before (in terms of time) the HDR image generated in step S416. Specifically, the system control unit 210 synthesizes a panoramic image with respect to an HDR image generated in step S411 and an HDR image generated in step S416, or with respect to an HDR image generated in step S416 and an HDR image generated in step S416 in the previous loop (in terms of time). At this time, necessary alignment for synthesizing a panoramic image is performed based on the stored motion vector detected from the images for HDR synthesis. In essence, the system control unit 210 performs calculation for the alignment processing (e.g., calculation of the motion vector) when performing the first synthesis and use a result of the calculation in the alignment processing when performing the second synthesis. This alignment will be described below.

In step S418, the system control unit 210 sets the exposure state to "under" again.

In step S419, the image capturing unit 204 captures an image under "under" exposure state. A series of processing described above is performed while a panning operation proceeds. Therefore, the image of under "under" exposure state that is captured in step S408 has a different viewing angle from the image captured in step S418.

In step S420, the image processing unit 206 performs development processing of the image captured in step S419 by the image capturing unit 204. A similar method to the method in step S406 can be used in the development processing.

In step S421, the system control unit 210 detects a motion vector based on the images for HDR synthesis that are generated in steps S414 and S420. The system control unit 210 stores the motion vector detected thereby.

In step S422, the image processing unit 206 performs synthesis with respect to two of the images for HDR synthesis on which the motion vector detection has been performed in step S421.

In step S423, the system control unit 210 synthesizes a panoramic image with respect to the panoramic image generated in step S417 and the HDR image generated in step S422. At this time, necessary alignment for synthesizing a panoramic image is performed based on the stored motion vector detected from the images for HDR synthesis.

In step S424, the system control unit 210 determines whether to terminate the panoramic image capturing. Although FIG. 4 illustrates that whether to terminate the panoramic image capturing is determined based on whether the predetermined maximum number of images are captured, this embodiment is not limited in this method. For example, panning angle of the digital camera 100 or cancellation in response to press of the switch SW2 may be used for the determination. In the flowchart illustrated in FIG. 4, if the predetermined maximum number of images is reached (YES in step S424), the processing proceeds to step S425, and the system control unit 210 stores the panoramic image synthesized in step S423 into the recording medium 130. On the other hand, if the predetermined maximum number of images is not reached (NO in step S424), the processing returns to step S412.

Image capturing operations corresponding to the flowchart in FIG. 4 is described with reference to FIG. 5. The user captures a panoramic image of an object region 500 while panning the digital camera 100. Images 501 to 506 are images acquired by the panoramic image capturing. Among the images 501 to 506, the images 501, 503, and 505 are captured under a "correct" exposure state, whereas the images 502, 504, and 506 are captured under an "under" exposure state. In parallel to the panning operation, the image processing unit 206 generates HDR images 511 to 515. Among the HDR images 511 to 515, the image processing unit 206 generates the HDR image 511 using the images 501 and 502. Similarly, the image processing unit 206 generates the HDR image 512 using the images 502 and 503, and generates the HDR image 513 using the images 503 and 504. The HDR images 514 and 515 are generated similarly. Next, the system control unit 210 synthesizes a panoramic image as soon as HDR images are generated. Sequentially, the system control unit 210 generates a panoramic image 521 using the HDR images 511 and 512. Next, as soon as the HDR image 513 is generated, the system control unit 210 synthesizes the HDR image 513 and the panoramic image 521 to generate a panoramic image 522. Similarly, the system control unit 210 generates a panoramic image 523 based on the panoramic image 522 and the HDR image 514, and generates a panoramic image 524 based on the panoramic image 523 and the HDR image 515. At this stage, processing for alignment and motion vector detection for the alignment are typically required for synthesis of panoramic image. In the present exemplary embodiment, since the motion vector is used at the time of generating the HDR images 511 to 515, it is unnecessary to newly detect motion vector. The reason is described below.

A first HDR image is a region where a second image for HDR synthesis overlaps a first image for HDR synthesis. A second HDR image is a region where a third image for HDR synthesis overlaps the second image for HDR synthesis. A third HDR image is a region where a fourth image for HDR synthesis overlaps the third image for HDR synthesis. Thus, the motion vector between the first and second HDR images is equal to the motion vector between the second and third images for HDR synthesis, and the motion vector between the second and third HDR images is equal to the motion vector between the third and fourth images for HDR synthesis. In other words, the motion vector between the first and third HDR images is the synthesized motion vector of the motion vector between the second and third images for HDR synthesis and the motion vector between the third and fourth images for HDR synthesis. Thus, the motion vector between Nth HDR image and the first HDR image is equal to the synthesized motion vector of the motion vectors from the motion vector between the second and third images for HDR synthesis to a motion vector between Nth and N+1th images for HDR synthesis. As described above, in the present exemplary embodiment, the HDR image alignment can be achieved by reading motion vector between images for HDR synthesis without detecting motion vector between HDR images.

In the example illustrated in FIG. 5, since panoramic image 524 is treated as a final output, the system control unit 210 stores a panoramic image 524 in the recording medium 130.

Since, as described above, in the method of synthesis of an HDR panoramic image that is described in the present exemplary embodiment, information about a motion vector at the time of HDR synthesis is also used in an alignment necessary to generate a panoramic image, it is unnecessary to obtain the motion vector for alignment again. Further, in a comparison between the two methods of synthesis of an HDR panoramic image that are illustrated in FIGS. 3 and 5, in the method illustrated in FIG. 5, one image is used to compose different HDR images and more HDR images are generated than those in the method illustrated in FIG. 3. Thus, if the viewing angle used in synthesis of a panoramic image is constant, the overlapped portion between the images is larger. In general, in the synthesis of a panoramic image, the larger the overlapped portion between the images is, the higher the accuracy of processing such as alignment is. Thus the synthesized image has higher quality. Specifically, in the case of capturing HDR panoramic images at a constant panning speed, the method in the present exemplary embodiment produces an HDR panoramic image with higher quality.

Further, the method illustrated in FIG. 5 enables faster panning than that in the method illustrated in FIG. 3. Specifically, the number of generated HDR images is greater in the method in FIG. 5 than that in the method in FIG. 3 although the same number of images are captured. Although the HDR images 311, 312, and 313 in FIG. 3 respectively correspond to the HDR images 511, 513, and 515 in FIG. 5, the HDR images 512 and 514 in FIG. 5 correspond no images in FIG. 3. In the method in FIG. 3, the HDR images 311 and 312 need to include an overlapped portion in order to generate the panoramic image 321. Panning speed during image capturing is limited by the overlapped portion as described above. On the other hand, in the synthesis method in the present exemplary embodiment as illustrated in FIG. 5, since there is the HDR image 512, the HDR images 511 and 512 only need to include at least an overlapped portion for generating the panoramic image 521. The HDR image 513 corresponding to the HDR image 312 in FIG. 3 and the HDR image and 511 do not necessarily have to include an overlapped portion.

Note that, in a case where a detection of a motion vector between images for HDR synthesis fails during the processing, not only the generation of an HDR image using the images for HDR synthesis but also alignment processing for subsequent HDR images cannot be performed.

For example, in a case where a motion vector between images 502 and 503 for HDR synthesis in FIG. 5 is unsuccessfully detected, and a motion vector between images 503 and 504 for HDR synthesis is successfully detected, HDR image 512 cannot be generated.

In this case, the system control unit 210 detects a motion vector between images 502 and 504 for HDR synthesis. If the motion vector between the images 502 and 504 for HDR synthesis is successfully detected, alignment processing of the HDR images 511 and 513 is performable using the detected motion vector.

Further, in a case where a motion vector between images 502 and 503 for HDR synthesis in FIG. 5 is unsuccessfully detected, and a motion vector between images 503 and 504 for HDR synthesis is also unsuccessfully detected, HDR images 512 and 513 cannot be generated.

In this case, the system control unit 210 detects a motion vector between images 502 and 505 for HDR synthesis. As described above, for obtaining a motion vector between images of different exposure values, it is preferable to adjust a gain of at least one of the images so that the images have the same brightness. If the motion vector between the images 502 and 505 for HDR synthesis is successfully detected, alignment processing of the HDR images 511 and 514 is performable using the detected motion vector.

Alternatively, in order to increase accuracy of motion vector detection, a motion vector between images 502 and 506 for HDR synthesis which have the same exposure state can be detected. However, in this case, HDR image 515 is to be synthesized with image 511. Therefore, the faster a panning speed is, the smaller an overlapped region between the HDR images 511 and 515 is. Further, there may be no overlapped region.

Two exposure states, "correct" and "under", are described above as an example in the exemplary embodiment, the exposure states are not limited to those described above. For example, three exposure states such as "correct", "under", and "over" can be employed. In this case, three images for HDR synthesis are used to compose an HDR image in step S411 and the like. Further, images can be captured while three or more exposure states are periodically switched.

According to the present exemplary embodiment, an HDR panoramic image can be generated from captured images while panning is performed, and thus the processing load on the system is reduced.

Other Embodiment

Furthermore, while, in the above-described exemplary embodiment, description has been made based on a personal digital camera, the present exemplary embodiment can also be applied to, for example, a mobile device, a smartphone, or a network camera connected to a server, as long as it is equipped with panoramic image capturing and composition functions.

Furthermore, the disclosure can also be implemented by processing for supplying a program for implementing one or more functions of the above-described exemplary embodiment to a system or apparatus via a network or a recording medium and causing one or more processors in a computer of the system or apparatus to read out and execute the program. Moreover, the disclosure can also be implemented by a circuit which implements one or more functions (for example, an application specific integrated circuit (ASIC)).

A digital camera for personal use is described above in the exemplary embodiment, any device having a panoramic image capturing and synthesis function, such as a mobile device, smartphone, or network camera connected to a server, is also applicable.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-041196, filed Mar. 7, 2018, which is hereby incorporated by reference herein in its entirety.

What is claimed is:

1. An image capturing apparatus, comprising:
an image sensor configured to capture a plurality of images of a panoramic image;
at least one memory configured to store instructions; and
at least one processor configured to communicate with the at least one memory and is configured to execute the instructions to:
set exposure states to make the exposure states different from each other while the image sensor captures two or more adjacent images among the plurality of images;
perform a first synthesis on different images of different exposure states among the plurality of images to generate a plurality of first synthesized images that are different from each other and each having a wider dynamic range than a dynamic range of the different images; and
perform a second synthesis using the plurality of first synthesized images to generate a second image having a wider viewing angle than a viewing angle of the plurality of first synthesized images,
wherein the different images correspond to different regions of the panoramic image, and wherein the first synthesis generates at least two of the first synthesized images from two pairs of images having a same one of the different images.

2. The image capturing apparatus according to claim 1, wherein the at least one processor executes further instructions to:
perform alignment processing when performing the first synthesis and the second synthesis, and
perform calculation for the alignment processing when performing the first synthesis and use a result of the calculation in the alignment processing when performing the second synthesis.

3. An image capturing apparatus, comprising:
an image sensor configured to capture a plurality of images of a panoramic image;
at least one memory configured to store instructions; and
at least one processor configured to communicates with the at least one memory and is configured to execute the instructions to:
set exposure states to make the exposure states different from each other while the image sensor captures two or more adjacent images among the plurality of images;
perform a first synthesis on different images of different exposure states among the plurality of images to generate first synthesized images that are different from each other and each having a dynamic range wider than a dynamic range of the different images,
determine first alignment information using a gain-decreased or gain-increased image such that a difference between the different images used in the first synthesis is less than a predetermined level;
perform a second synthesis using the first alignment information and the plurality of first synthesized images to generate a second image having a wider viewing angle than a viewing angle of the plurality of first synthesized images,
wherein the different images correspond to different regions of the panoramic image.

4. The image capturing apparatus according to claim 3, wherein the at least one processor executes further instructions to detect a motion vector when performing the first synthesis and use the motion vector in the second synthesis.

5. The image capturing apparatus according to claim 1, wherein the at least one processor executes further instructions to perform the second synthesis sequentially on the plurality of first synthesized images to generate the second image.

6. The image capturing apparatus according to claim 1, wherein the at least one processor executes further instructions to set the exposure states to make the exposure state changed periodically while the image sensor captures the plurality of images.

7. The image capturing apparatus according to claim 6, wherein the at least one processor executes further instructions to perform the first synthesis on the images of different exposure states whose number is corresponding to a number of the images of one period.

8. The image capturing apparatus according to claim 7, wherein the number of the images of the one period is two or three.

9. A method for controlling an image capturing apparatus including an image sensor configured to capture a plurality of images of a panoramic image, at least one memory configured to store instructions, and at least one processor configured to communicate with the at least one memory, the method comprising:
setting exposure states to make exposure states different from each other while the image sensor captures two or more adjacent images among the plurality of images;
performing a first synthesis on different images of different exposure states among the plurality of images to generate a plurality of first synthesized images that are different from each other and each having a wider dynamic range than a dynamic range of the different images; and
performing a second synthesis using the plurality of first synthesized images to generate a second image having a wider viewing angle than a viewing angle of the plurality of first synthesized images,
wherein the different images correspond to different regions of the panoramic image, and
wherein the first synthesis generates at least two of the first synthesized images from two pairs of images having a same one of the different images.

10. A method for controlling an image capturing apparatus including an image sensor configured to capture a plurality of images of a panoramic image, at least one memory configured to store instructions, and at least one processor configured to communicate with the at least one memory, the method comprising:
setting exposure states to make the exposure states different from each other while the image sensor captures two or more adjacent images among the plurality of images;
performing a first synthesis on different images of different exposure states among the plurality of images to generate first synthesized images that are different from each other and each having a dynamic range wider than a dynamic range of the different images,
determining first alignment information using a gain-decreased or gain-increased image such that a difference between the different images used in the first synthesis is less than a predetermined level; and
performing a second synthesis using the first alignment information and the plurality of first synthesized images to generate a second image having a wider viewing angle than a viewing angle of the plurality of first synthesized images,
wherein the different images correspond to different regions of the panoramic image.

11. A non-transitory computer-readable storage medium for storing instructions that cause a computer to execute a method of controlling an image capturing apparatus including an image sensor configured to capture a plurality of images of a panoramic image, at least one memory configured to store instructions, and at least one processor configured to communicate with the at least one memory, the method comprising:
setting exposure states to make the exposure states different from each other while the image sensor captures two or more adjacent images among the plurality of images;
performing a first synthesis on different images of different exposure states among the plurality of images to generate a plurality of first synthesized images that are different from each other and each having a wider dynamic range than a dynamic range of the different images; and
performing a second synthesis using the plurality of first synthesized images to generate a second image having a wider viewing angle than a viewing angle of the plurality of first synthesized images, wherein the different images correspond to different regions of the panoramic image, and wherein the first synthesis generates at least two of the first synthesized images from two pairs of images having a same one of the different images.

12. A non-transitory computer-readable storage medium for storing instructions that cause a computer to execute a method of controlling an image capturing apparatus including an image sensor configured to capture a plurality of images of a panoramic image, at least one memory configured to store instructions, and at least one processor configured to communicate with the at least one memory, the method comprising:

setting exposure states to make the exposure states different from each other while the image sensor captures two or more adjacent images among the plurality of images;

performing a first synthesis on different images of different exposure states among the plurality of images to generate first synthesized images that are different from each other and each having a dynamic range wider than a dynamic range of the different images, determining first alignment information using a gain-decreased or gain-increased image such that a difference between the different images used in the first synthesis is less than a predetermined level; and performing second synthesis using the plurality of first synthesized images to generate a second image having a wider viewing angle than a viewing angle of the plurality of first synthesized images, wherein the different images correspond to different regions of the panoramic image.

* * * * *